United States Patent [19]

Ezaki

[11] 4,084,494

[45] Apr. 18, 1978

[54] FOOD PROCESSING DEVICE

[76] Inventor: Masatsugu Ezaki, 29-3-chome, Kohama-honmachi, Sumiyoshi-ku, Osaka, Japan

[21] Appl. No.: 651,035

[22] Filed: Jan. 21, 1976

[51] Int. Cl.² .............................................. A21C 9/06
[52] U.S. Cl. ..................................... 99/450.7; 99/494; 118/21
[58] Field of Search ................ 99/450.1, 450.6–450.8, 99/494, 516, 352; 118/20–21, 56, 63–64, DIG. 10; 141/165, 327; 53/183, 266

[56] References Cited

U.S. PATENT DOCUMENTS

| | | | |
|---|---|---|---|
| 2,674,958 | 4/1954 | Puls | 99/450.6 |
| 3,557,716 | 7/1968 | Westin | 118/21 |
| 3,583,336 | 6/1971 | Vallerga | 99/450.8 |

Primary Examiner—Harvey C. Hornsby
Assistant Examiner—Robert Pous

[57] ABSTRACT

The present invention relates to the food processing device for producing cylindrically shaped foods having pasty flavors therein.

1 Claim, 8 Drawing Figures

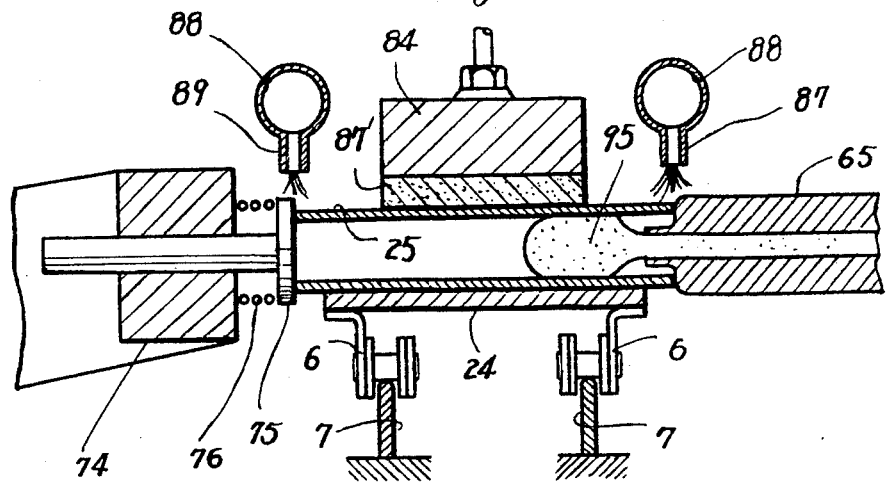
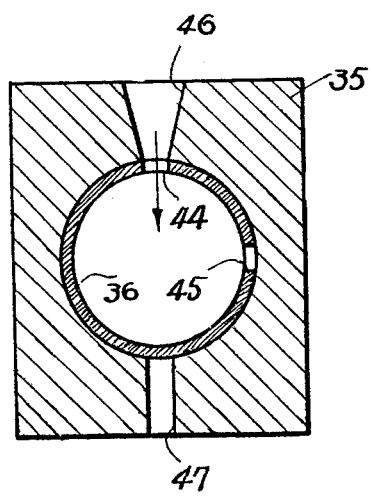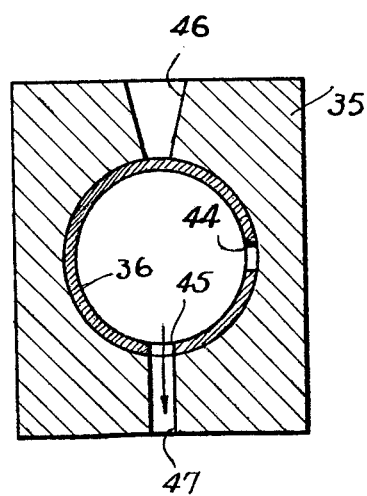

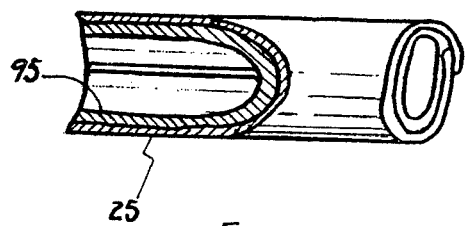
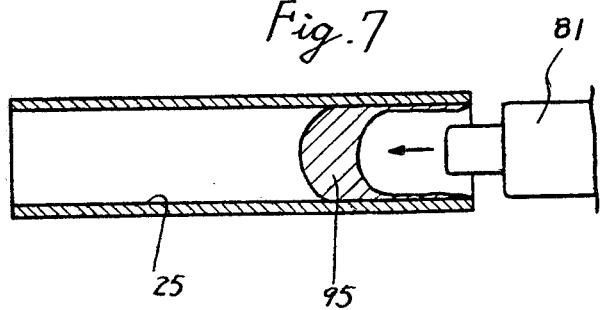

FOOD PROCESSING DEVICE

The device comprises a conveyor for transferring cylindrical outer shell foods at interval, a keep plate positioned about the conveying means to keep the shell foods, when the conveying means is stopped, measuring means for measuring pasty flavour, an extruding nozzle for extruding the measured pasty flavour into the shell foods on the conveyor, and an air jet nozzle for jetting air into the flavour inserted cylindrical shell foods to thinly prolong the pasty flavours on the inner surface of the shell foods, whereby the pasty flavours can be thinly coated on the inner surface of the cylindrical shell foods.

The present invention relates to a food processing machine which is provided with a means for filling such pasty flavour as foamed cream, past chocolate and the like in cylindrically shaped foods. Foods subjected to be produced by the food machine according to the present invention are cylindrical confectionaries having outer shell food which are made of wafer, candy, sponge cake, etc. The outer shell foods are filled with artificially prepared confectionary substances like above mentioned foamed cream, natural flavour like honey and other pasty sauces like mayonnaise and ketchup.

Prior operation for filling pasty flavour on a cylindrical outer shell food has been manual and required a lot of labor.

It is accordingly a main object of the present invention to provide a food processing machine which performs more efficient filling operation by machine than manual thereby being hygienic and also reducing the cost of the foods.

It is another object of the present invention to fill pasty flavour in a cylindrical outer shell food in a manner that the said pasty flavour spreads at a suitable thickness in the outer shell food wherein a small amount of pasty flavour is coated equally on the interior surface of the outer shell food thereby being useful for making the food taste homogeneous and achieving a control of salted and sweetened taste of foods. It is also effective in accelerating drying the flavour to coat it at an equal thickness as mentioned above. Other objects and advantages of the present invention will appear from the following detail description of preferred embodiments of the invention.

DESCRIPTION OF THE DRAWING

The invention will be explained in conjunction with an illustrative embodiment shown in the accompanying drawing, in which

FIG. 4 is a schematic view taken between line IV—IV of FIG. 2 to illustrate the operation;

FIGS. 5 and 6 are diagrammatic views taken on line V—V of FIG. 2 to illustrate the operation, and FIGS. 7 and 8 are views illustrating the food processing operation.

DESCRIPTION OF SPECIFIC EMBODIMENT

An embodiment as shown in the accompanying drawing comprising conveyor means for transferring cylindrical outer shell foods at intervals, means for filling pasty falvours in the said outer shell food and means for spreading said flavour thinly. All the mean as mentioned above are supported by a frame 1 made of section steel.

Figure 1:
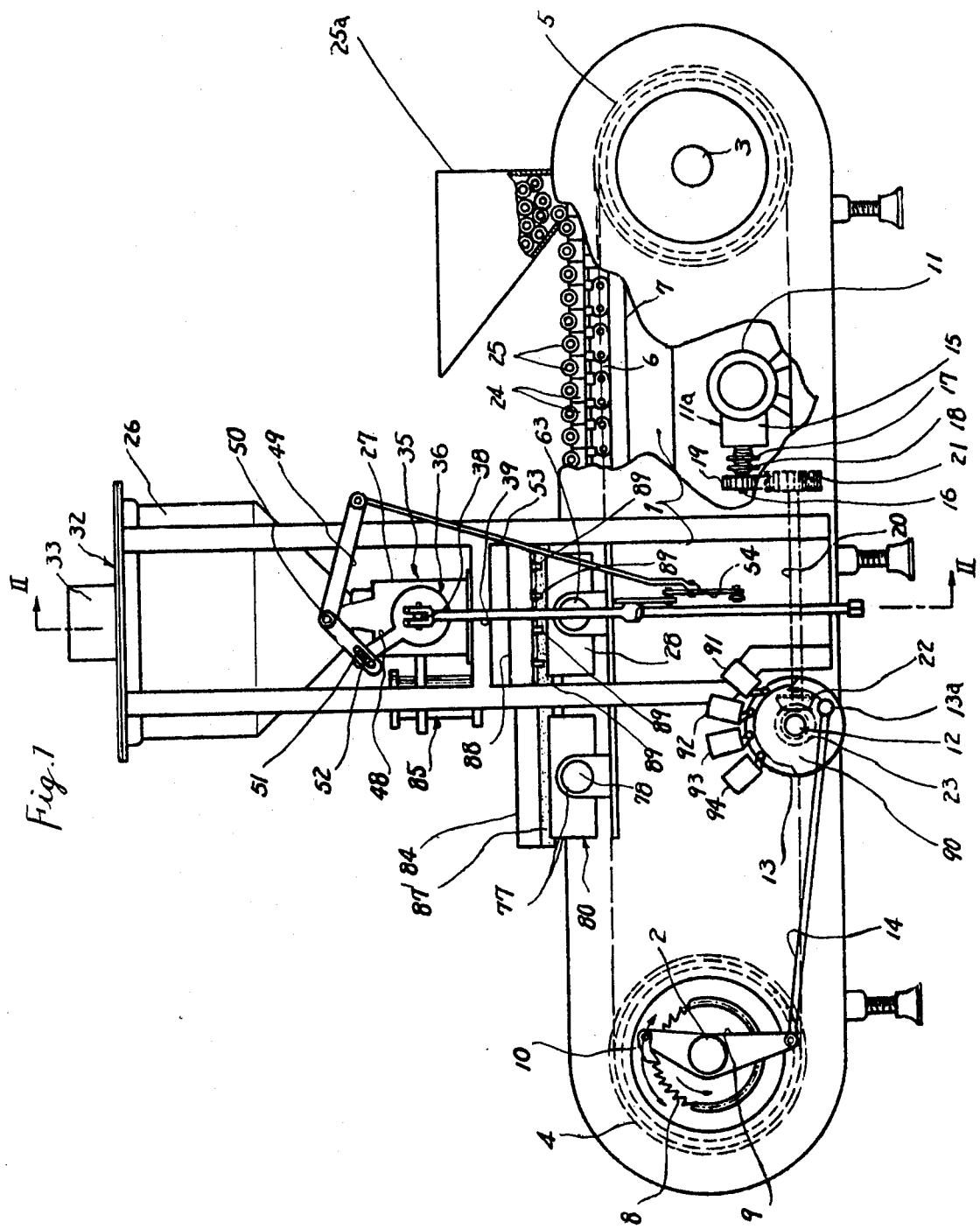
FIG. 1 is a side elevational view illustrating an embodiment according to the present invention.

As shown in FIG. 1, the said frame 1 supports chain sprocket wheels 4 and 5 through shafts 2 and 3. Between the sprocket wheels 4, 5, an endless chain 6 spans.

In FIG. 1, one chain 6 is shown, however two chains 6, 6 are mounted along guides 7, 7. The sprocket wheel 4 is connected to a ratchet wheel 8 through the shaft 2 while the shaft 2 pivotally supports a lever 9 which has a pawl 10 at an end. The ratchet 8, the lever 9 and the pawl 10 have a function of converting continuous rotary motion from a prime mover 11 into an intermittent rotary motion the chain sprocket wheel 4.

The lever 9 and the prime mover are connected to each other through a power transmission system as shown below. The frame 1 supports pivotally a shaft 12 through any suitable bearing (not shown) between the lever 9 and the prime mover 11. The shaft 12 secures a crank 13 so that a crank pin 13a lower end of the lever 9 through a crank shaft 14. In a hocesing 11a of the prime mover 11 a reduction gear 15 is mounted in a body on which a power shaft, two chain sprocket wheels 17, 18 and a pinion 19 are secured.

Between the shaft 12 supporting the crank 13 and the reduction gear, a power transmission shaft 20 is supported by the frame 1, while a gear secured on an end of the power transmission shaft 20 engages with the pinion 19. Then the other end of the power transmission shaft 20 is connected to a crank shaft 12 through a pair of level gears 22, 23 thereby connecting the prime mover 11 to the lever 9.

Operation of the above mentioned conveyor means are as follows.

Power from the prime mover 11, after being moderated by the reduction gear 15, is transmitted through the power transmission shaft 20 to the crank 13. Further a rotary motion of the crank pin 13a on the crank 13 is transmitted to the lever 9 through the connecting rod 14. The pawl 10 provided on the upper end of the lever 9 slides on the ratchet 8 when the lever 9 turns clockwise and it engages with the ratchet 8 when the lever 9 turns counterclockwise to turn the chain sprocket wheel 4 at as much angles as corresponding to the swing of the lever 9. The lever 9 is repeatedly swung by the crank 13, and then the endless chain 6 engaging with the chain sprocket wheel 4 will be moved at intervals. A motion of the chain 6, that is to say a motion interval can be designated in accordance with a ratio of two radii of rotation of the crank pin 13a and the lower end of the lever 9.

Figure 2:
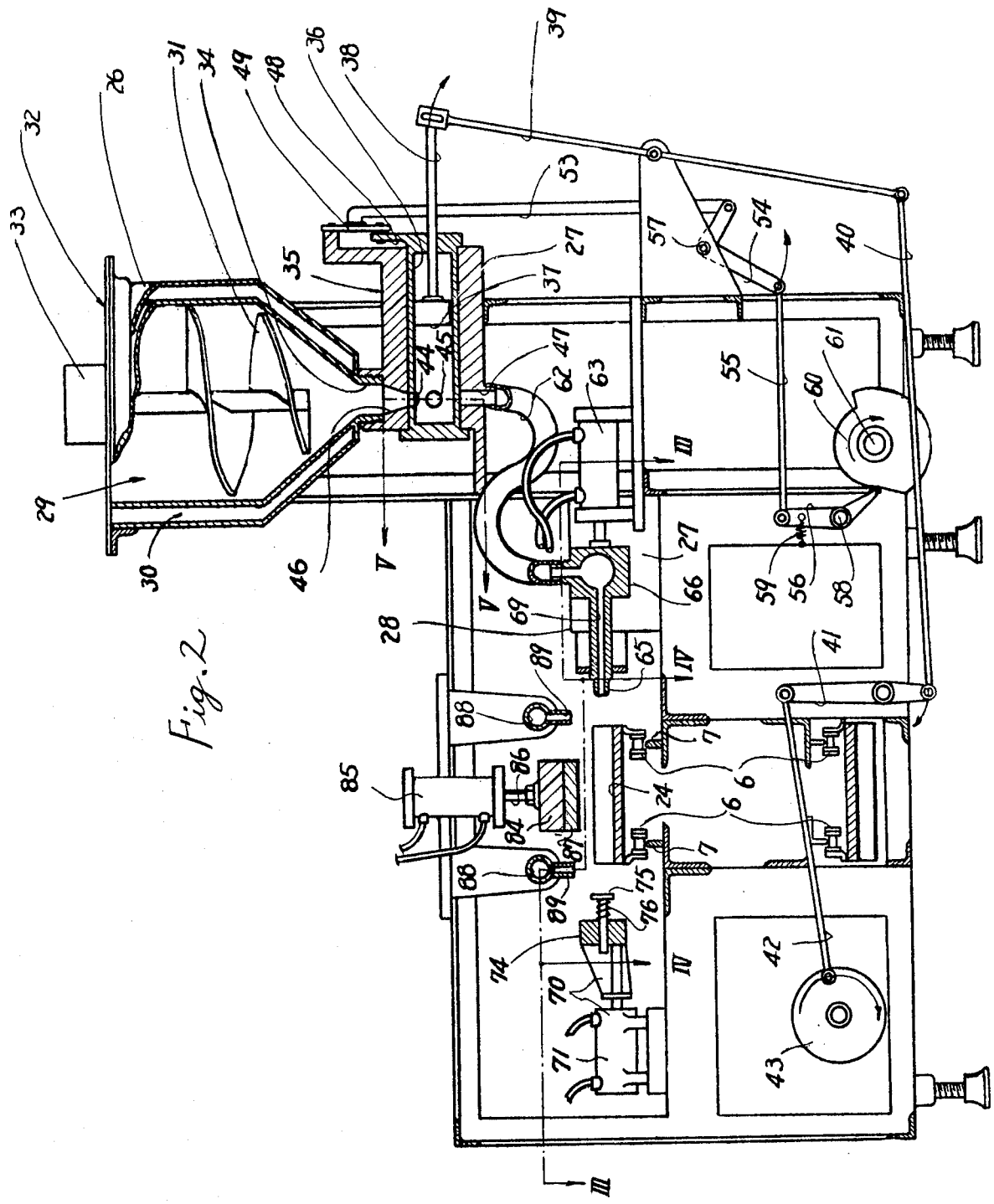
FIG. 2 is a sectional view taken on line II—II of FIG. 1.

As shown in FIGS. 1 and 2, mounted on a pair of the chain 6, 6 parallel to each other are a plurality of grooved food supports 24, 24—arranged parallel to each other at regular intervals which are corresponding to the motion interval of the chain 6. The food supports 24 have a function of keeping cylindrical shell foods 25 in the grooves and adopted to receive automatically the shell foods from a container 25a. Further, as shown in FIG. 2, the above mentioned means for filling pasty flavour in a cylindrical shell food comprises a hopper 26, a measuring device 27 and an injection device 28. The hopper 26 is consisting of an inner chamber 29 and an outer closed chamber 30. Hung in the chamber is a screw 31 which is driven by a motor 33 mounted on the top end panel 32 and which helps to force a comparatively lightweight pasty flavour like formed cream go downward in the chamber 29. The outer chamber 30 accommodates such heating medium as hot water or a heater to avoid solidification of unstable pasty flavour. An outlet 34 provided at a lower end of the hopper 26 is connected to a measuring device 27 which is adopted to rotatably support a cylinder 36 in a housing 35 in which a piston 37 is mounted. One end of a rod 38 of the piston 37 is connected to a swing rod 39 which is further connected to a crank 43 through a connecting rod 40, lever 41 and connecting rod 42. The crank 43 is linked through a chain to the chain sprocket wheel 17 fixed on the power shaft 16 of the motor as shown in FIG. 1. Opening on the side wall of the cylinder 36 are two ports 44, 45, while the housing 35 is adopted to provide an upper inlet 46 and a lower outlet to functionate a valve mechanism.

Referring to FIG. 5, the pasty flavour kept in the hopper 26 can be introduced into cylinder 36 as the port 44 meets with the inlet 46. Thereafter, as shown in FIG. 5, when the cylinder 36 is turned in an angle of 90° clockwise, the port 45 will be aligned with the outlet 47 to allow the pasty flavour kept in the cylinder 36 pass through the outlet 47. Mechanism to turn the cylinder 36 is shown as follows. The cylinder 36 stretches an arm 48 at its end while the housing 35 pivotally supports a swing rod 49 through a pin 50. An elongated hole 51 formed on one end of the swing rod 49 is adopted to bit to a pin 52 extending from the arm 48. The other end of the swing rod 49 is connected to a connecting rod 53. When the connecting rod 53 is shifted in its axis direction, the swing rod 49 swings about the axis of the pin 50 thereby resulting in allowing the rotation of the cylinder 36. Shifting motion of the connecting rod 53 will be shown as follows. Referring to FIG. 2, the lower end of the connecting rod 53 is linked to a lever 56 through a link 54 and a connecting rod 55. The link 54 and the lever 56 are pivotally supported through a pin 57 and a pin 58 respectively on the frame 1. Further, the lower end of the lever 56 is secured against a cam 60 by means of a spring 59. The cam 60 is also pivotally supported by the frame 1 through an axle 61 in order to link the chain sprocket wheel with the shaft 61 thereby transmitting power of the prime mover 11 as a rotary motion. Then the cam 60 as shown in FIG. 2 forces the lever 56 to turn clockwise about a pin 58 during a single turn of the cam 60 or the lever 56 can be turned about the axis of the pin 58 counter-clockwise by resilience of the spring 59 also to force the link 54 to swing back thereby shifting the connecting rod 54.

Figure 3:
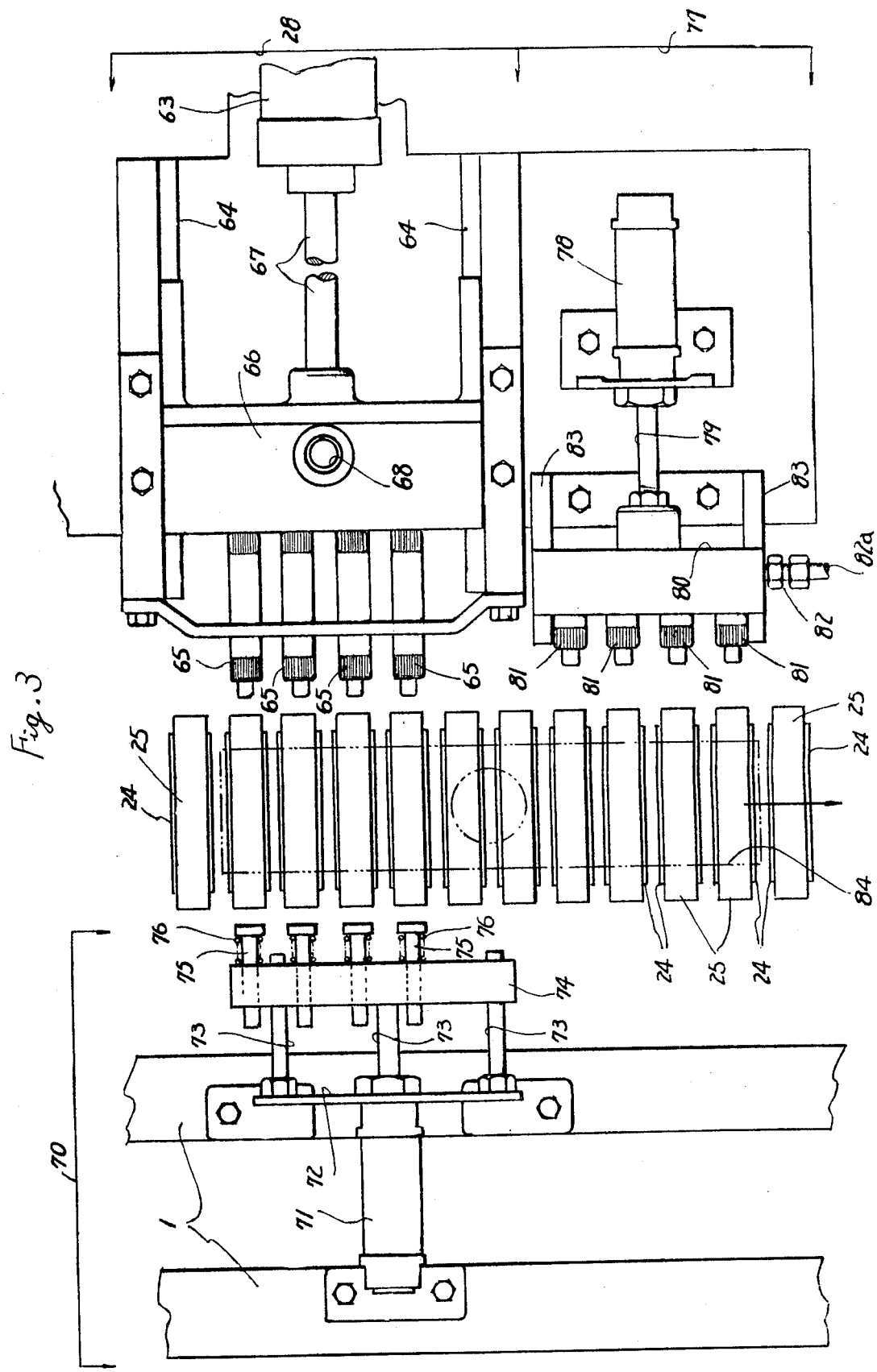
FIG. 3 is a sectional view taken on line III—III of FIG. 2.

The injection means 28 as shown in FIG. 2 is connected to an outlet 47 adopted in a housing of measuring means 27 through a hose 62. The injection means 28 in FIG. 3 is constructed in a form of a block to be provided with an air cylinder 63, guide rail 64 and four nozzles 65. There nozzles 65 are connected to the block 66 through the piston rod 67 in the air cylinder 63 where a piston actuates the block 66 to reciprocate along the guide rail 64. Provided on the upper portion of the block 66 is a port 68 which is connected together with four nozzles 65 by means of a path in the block 66, and the port 68 is also connected to the hose 62. The injection device 28 has a plurality of nozzles each directed to the food supports 24 beyond which there is a stopper device 70 oppositely arranged to the filling device 28. The stopper device 70 as shown in FIG. 3 is so constructed that there is a flat bar 72 on the air cylinder that is fixed on the frame 1, the flat bar extending three arms 73, on an end portion of which a stopper support 74 is fixed. The stopper support 74 supports a movable stopper 75 that is made of four pieces of rods to allow the latter to stroke, and each stopper 75 is extended always to the food support 24 by means of a spring 76. The injection device 28 is arranged in line with an air cylinder 77 as shown in FIG. 3. The air cylinder is located behind the injection device 28 with regard to the direction of the movement of the food support 24. Secured on the block 80, which is mounted on the front end of the piston rod 79 of the air cylinder 78, are four nozzles 81 which are adopted to inject air that is fed from a joint on the side of the block 80. The block itself is reciprocably moved along the guide rails 83, 83 by means of the air cylinder 78.

As shown in two-dot chain line in FIG. 3, there is arranged to extend a keep plate 84 in a range of nozzles 65 and 81. The keep plate 84 is installed at a lower end of the piston rod 86 that is fixed on the frame 1 as shown in FIG. 1, and the lower surface of the keep plate 84 is provided with a cushion material 87 like foamed resine or felt. Arranged above and on opposed end of the food support 24 are a pair of air jet nozzles 88, 88 as shown in FIGS. 2 and 4. Four nozzles 89 of the air cylinder 88 in FIG. 1 are directed downwardly and each of four nozzles are located so as to meet with each corresponding food support 24 in each starting position. The nozzles 89 jet considerably a strong air flow so that when the pasty flavour is protruded outward from any end of the shell food, this protruded flavour can be blown off downwardly.

Four cylinders 63, 71, 78 and 75 in the construction as mentioned above is adopted to be operated one after another at a suitable time delay.

In this embodiment according to the present invention, a requence device is mounted as further explained as follows. A cam 90 is fixed on the shaft 12 in FIG. 1. Arranged around the cam 90 are four limit switches 91, 92, 93 and 94 whereby magnetic switch valves (not shown) are activated by the limit switches 91, 92, 93 and 94. Air flow which is controlled by the magnetic valves actuates four cylinders one after another at a suitable delay. Consequently when a magnetic switch valve is actuated by the extreme right sided limit switch 91, a cylinder 85 starts to be operated. Rotation of the cam 90 is counter-clockwise and the keep plate 84 starts to come down at first. Subsequently the second and third limit switches 92, 93 are engaged respectively with the air cylinders 71 and 63. Then the stopper 70 and the injection means start to move. Accordingly, when the fourth limit switch 94 and the cylinder 98 is engaged, the air jet device 77 start to be operated.

Moreover, the operation as mentioned above can be repeatedly put back every revolution of the cam 90. The construction according to this invention has been discussed above, however, the operation will fully appear hereunder. The lever 9, the pawl 10, ratchet wheel 8 are functionated to move the chain at suitable intervals wherein the chain 6, 6 support a plurality of food supports 24. The direction of the movement of the chain 6, 6 is shown by an arrow A in FIG. 3, and it is a right angled direction with regard to the stroke action of nozzle 65, 81 wherein the motion is not designed that the food supports 24 meet with each corresponding nozzle 65 or 81 and movable stopper 75. The interval motion of the chain 6, 6 and the motion of other unitary devices are resulted from a prime mover 11 as follows. When the chain 6, 6 is stopped, the limit switches 91, 92, 93 and 94 are closed by the cam 90 one after another. These switches and air cylinders are related as mentioned above, consequently the keep plate 84 comes down on the food supports when the chain 6, 6 is stopped, as shown in FIG. 4, so as to keep the shell food 25 stable between the food supports 24 and the plate 84. Subsequently, four movable stoppers 75 move together with stopper supports 74 toward the shell food. Slightly after this motion of the stopper 74, four nozzles 65 shift toward the shell food 25. Accordingly, when one end of the shell food 25 is secured against the movable stoppers 75, the nozzles 65 are inserted into the other end of the shell food 25. At the instance when the nozzle 65 is inserted into the shell foods 25, measured pasty flavour 95 at a suitable quantity will be fed into the shell foods 25 as shown in FIG. 4. This function will further be explained in the following descriptions.

Air nozzles 81 which are mounted behind the nozzles 65 that are inject pasty flavour will be pressed toward front position by the action of the air cylinders, as same as the above mentioned mechanisms, when the food support 24 is stopped. The nozzle 81 is connected to a pipe joint 82 through a path (not shown) in the block 80. One end of the tube 82a is connected to the pipe joint 82 and the other end of the tube 82a being connected to any suitable pump, then the air is blown into the shell food 25 through the nozzle 81, whereby the pasty flavour within the shell food 25 flows from one end of the shell food to other end as shown in FIG. 7. The pasty flavour, thus, is thinly prolonged on the inner surface of the shell food, thereby thinly coating the pasty flavour on the inner surface of the shell food as shown in FIG. 8.

Further, said limit switches 92, 93 and 94 are changed into OFF condition by cam 90 while in stop of the chain 6, 6. Thus, air is supplied into the opposite chamber of the air cylinders 85, 71, 63, and 78. Whereby the press plate 84, movable stopper 75, and nozzles 65 and 81 are parted from the shell food 25. Then, the chain 6, 6 having the supports 25 are moved by settled distance by means of a ratchet wheel 8.

The motion of the extrusion of the pasty flavour from the nozzle 65 into the shell foods 25 is as follows. The motion of the crank 43 is transmitted to the piston 37 through the connecting rod 42, the lever 41, the connecting rod 41 and the swing lever 39. When the piston is moved rightward in FIG. 2, the cylinder 36 is adapted to stop at first position as shown in FIG. 5 so as to push the pasty flavour into the cylinder 36. When the piston 37 is moved leftward in FIG. 2, the cylinder 36 is adapted to stop at second position as shown in FIG. 6 so as to extrude the pasty flavour in the cylinder from the outlet 47, whereby the pasty flavour can be extruded from the nozzles 65 through the hose 62 and the passage 69. If the stroke of the piston 37 is adjustably arranged, the volume to be extruded from the nozzle may be suitably adjusted by changing the stroke of the piston 37.

While in the foreging specification, a detailed description of specific embodiments of the invention were set forth for the purpose of illustration, it is to be understood that many of the details hereingiven may be varied considerably by those skilled in the art without departing from the spirit and scope of the invention.

What is claimed is:

1. A food processing device comprising a conveyor for intermittently conveying cylindrical shell foods having a pair of open ends, a keep plate positioned above the conveyor and mounted for reciprocation toward and away from the conveyor when the conveyor is stopped to hold the shell foods, measuring means for measuring pasty flavour, an extruding nozzle for extruding the measured pasty flavour into the shell foods on the conveyor, the extruding nozzle being reciprocably mounted and having an open end which is reciprocable when the conveyor is stopped between a first position in which the open end is positioned outside of a cylindrical shell and a filling position in which the open end is positioned slightly inwardly of one of the open ends of a cylindrical shell, a stopper mounted for reciprocation toward and away from the open end of the shell food opposite the extruding nozzle when the conveyor is stopped, and an air jet nozzle for jetting air into the flavour inserted cylindrical shell foods and for thinly coating the pasty flavour on the inner surface of the shell food, the air jet nozzle being reciprocably mounted and having an open end which is reciprocable when the conveyor is stopped between a first position in which the open end is positioned outside of a cylindrical shell and a coating position in which the open end is positioned slightly inwardly of one of the open ends of a cylindrical shell, the air jet nozzle being spaced from the extruding nozzle in the direction in which the conveyor advances whereby the open ends of the extruding nozzle and the air jet nozzle are substantially simultaneously reciprocated into their second positions into cylindrical shell foods spaced along the conveyor when the conveyor is stopped, whereby each food shell is treated first by an extruding nozzle then by a downstream airjet nozzle.

* * * * *